Figure 3:
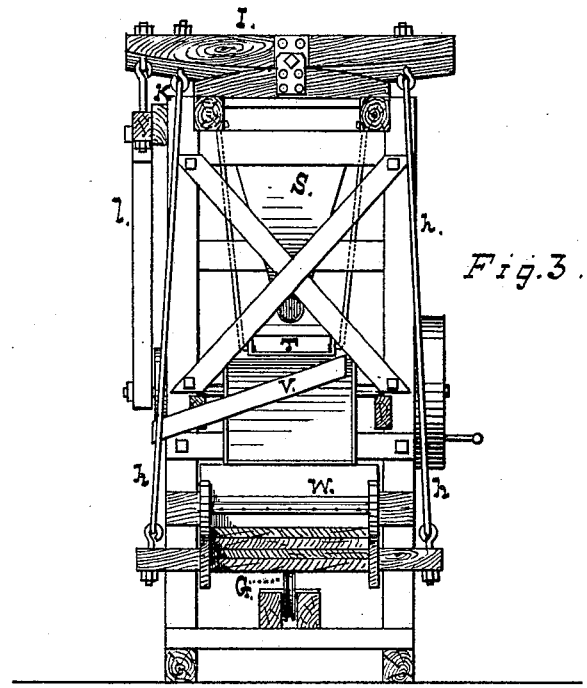

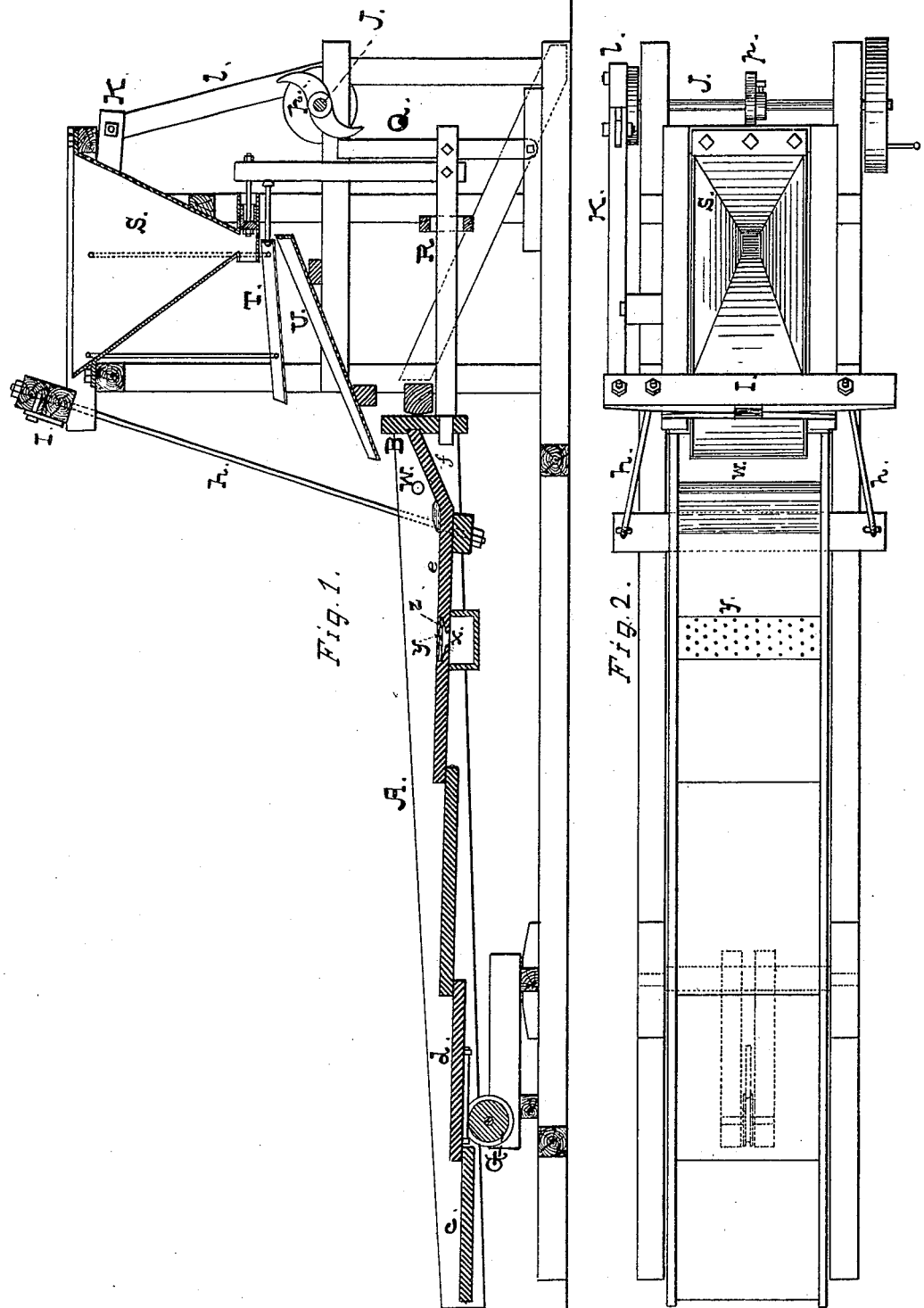

(No Model.) 2 Sheets—Sheet 2.

C. W. PATTEN.
AMALGAMATOR AND CONCENTRATOR.

No. 249,791. Patented Nov. 22, 1881.

Witnesses:

Inventor:
Chas. W. Patten
By his Attys

UNITED STATES PATENT OFFICE.

CHARLES W. PATTEN, OF SAN FRANCISCO, CALIFORNIA.

AMALGAMATOR AND CONCENTRATOR.

SPECIFICATION forming part of Letters Patent No. 249,791, dated November 22, 1881.

Application filed March 3, 1881. (No model.)

*To all whom it may concern:*

Be it known that I, CHARLES W. PATTEN, of the city and county of San Francisco, in the State of California, have invented an Improved Amalgamator and Concentrator; and I do hereby declare that the following is a full, clear, and exact description thereof, reference being had to the accompanying drawings.

My invention relates to an improved machine for amalgamating the free particles of gold and concentrating the sulphurets and other heavy particles contained in ore pulp, sand, gravel, and other auriferous material, and refers more particularly to that class in which the trough is supported at its front end upon suitable wheels or rollers, and having imparted to it a compound lateral and longitudinal motion.

The invention consists in the details of construction as illustrated in the drawings and hereinafter described.

Figure 4:
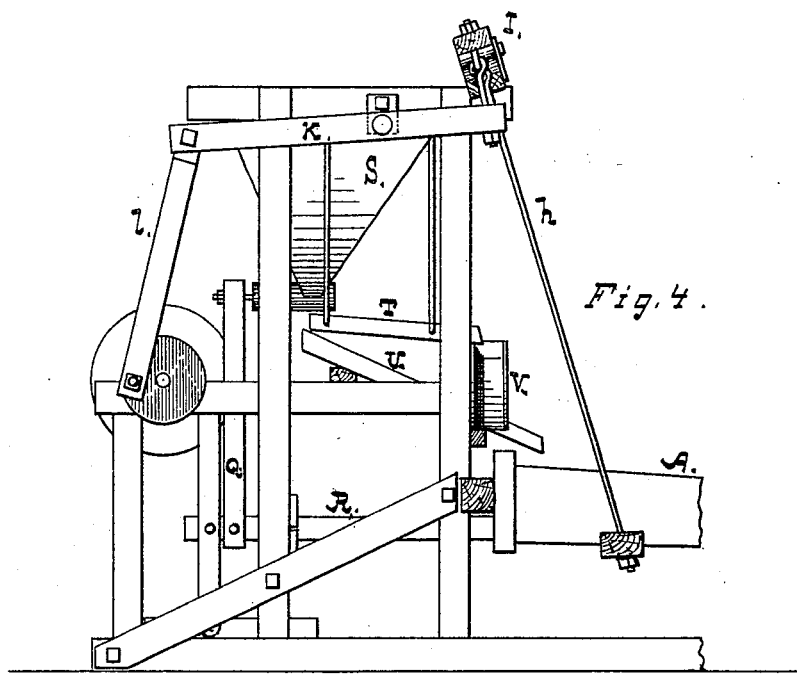

Referring to the accompanying drawings, Figure 1 is a longitudinal section. Fig. 2 is a top view. Fig. 3 is a vertical transverse section. Fig. 4 is a side elevation taken from the left-hand side of Fig. 3.

A is a trough or sluice-box, the upper or receiving end of which is closed by an end board, B. The floor of this box or trough is made of two or more sections or lengths, which overlap each other at one end, as shown. The lower section, c, is placed at a slight inclination toward the closed end of the box or trough. The next section, d, is placed with its lower end resting upon and overlapping the upper end of the section c, thus causing its upper surface to be slightly inclined toward the closed end of the box. The next section and the succeeding ones are all placed and secured in the same manner, only the upper section is formed of two inclined surfaces, e f, the upper one of which (marked f) inclines in an opposite direction, extending from the head-board B, so as to meet the rearwardly-inclining forward half or surface, e, thus forming a shallow V-shaped trough at the upper end of the box. The surface of the box therefore has the V-shaped trough at its upper end, next to the head-board, and two or more backwardly-inclined surfaces, the ends of which overlap each other. All of these surfaces may be covered with copper and amalgamated, if desired; but in practice I find it only necessary to copper and amalgamate the V-trough and one or two of the upper sections. This box I mount at a slight inclination, with its closed or receiving end somewhat higher than its open or discharge end, so as to obtain a ready flowage of the pulp over the surfaces and through the box. I support the box upon one or more wheels or pulleys, G, upon which the under side of the box rests midway between its sides, suitable grooves being made lengthwise of the box, in which the wheels traverse. This permits the box to rock from side to side and at the same time move longitudinally back and forth. Usually I shall suspend one end of the box from the rocking mechanism, as represented in the drawings, and in that case a single supporting-wheel only will be required underneath the box, at or near its opposite or discharge end.

Various devices can be employed for imparting a rocking and longitudinal motion to the box or trough. I have represented, however, to accomplish the rocking effect, two rod-hangers, h h, connecting the opposite sides of the upper or receiving end of the box with the opposite ends of an overhead rocking or walking beam, I, which is mounted on a frame above the trough. Motion is imparted to this rocker or walking beam from a crank-shaft, J, by a system of levers, K l. The longitudinal or lengthwise motion is produced by a cam or cams, p, on the crank-shaft J acting against a lever, Q, from which a push-beam, R, extends to the closed or upper end of the box. The forward end of this push-beam is turned round and fits in a round hole in the end of the box, so that it does not interfere with the rocking motion.

In the frame-work above the receiving or closed end of the trough I mount a hopper, S, into which the pulp or material to be treated is placed. Below the bottom of the hopper I place a shaking-screen, T, through which the material is sifted by the motion of the screen before it passes into the chute U, which delivers it to the box. The large pieces which cannot pass through the screen are delivered on one side and conducted outside of the machine through a side chute, V.

In operating the machine I place a quantity of quicksilver in the V-trough at the upper end of the box, and the pulp, sand, or other material to be treated is sifted from the hopper and falls into the V-trough. A perforated water-pipe, W, extends across the box close to its upper or closed end, through which numerous fine streams of water are ejected into the trough and upon the quicksilver. The rocking motion of the box then agitates the pulp, water, and quicksilver, throwing it first from one side to the other in the manner of hand-panning, or, more properly, similar to the operation performed by the rocker formerly used in placer-mining, so as to bring the gold particles in contact with the quicksilver, and thus insure amalgamation. The water carries the pulp along over the inclined sections. As it passes up the grade of each section the heavy particles are settled to the bottom by the rocking motion, while the backward motion and sudden jar or concussion cause them to travel back to the lowest part of the inclines, the light portion being carried continuously forward and over the discharge end of the box by the water. Transversely across the bottom of the upper or pan-shaped section I make a passage or channel, X, which passes entirely through the floor in front of the mercury-trough, and this passage or channel I cover with a plate, $y$, in which a number of holes or perforations are made. Underneath this plate I arrange another and similar plate, $z$, in which similar and corresponding perforations are made, so that it will slide back and forth and cover and uncover the holes in the upper plate. In starting the machine I leave the holes covered until a quantity of sulphurets have accumulated, after which I draw the lower plate or slide, so as to uncover the holes and allow the sulphurets to pass through as fast as they accumulate into an inclined trough below, by which they are conducted into a receptacle on one side of the machine, thus providing an automatic discharge for the sulphurets.

Having thus described my invention, what I claim, and desire to secure by Letters Patent, is—

1. The inclined sluice box or trough A, having its bottom formed of two or more rearwardly-inclined sections, $c\, d$, the upper section being formed of two inclined surfaces, $e\, f$, the surface $e$ provided with a transverse discharge passage or channel, X, having the perforated regulating-plates $y\, z$, in combination with mechanism, substantially as shown and described, for imparting to the box A a transverse rocking motion and a longitudinal vibration and jar, for the purpose set forth.

2. The pan, sluice, or trough A, having its forward end supported on a single wheel midway between its sides, and its rear end suspended from a rocker or walking beam, I, by rods $h\, h$, in combination with the crank-shaft J and levers K $l$, substantially as specified.

3. The inclined pan, sluice, or trough A, supported at its front end by a single wheel or roller, G, and suspended at its rear end by rods $h\, h$ from a rocking beam, I, in combination with the push-beam, R, lever Q, cam $p$, and crank-shaft J, substantially as and for the purpose described.

In witness whereof I have hereunto set my hand.

CHARLES W. PATTEN.

Attest:
GEO. T. KNOX,
WM. H. CLARK.